(12) United States Patent
Bottner

(10) Patent No.: US 8,029,035 B1
(45) Date of Patent: Oct. 4, 2011

(54) EXTENDABLE GRIPPING DEVICE

(76) Inventor: Randy K. Bottner, Savannah, GA (US)

( * ) Notice: Subject to any disclaimer, the term of this patent is extended or adjusted under 35 U.S.C. 154(b) by 159 days.

(21) Appl. No.: 12/614,982

(22) Filed: Nov. 9, 2009

Related U.S. Application Data

(60) Provisional application No. 61/198,550, filed on Nov. 7, 2008.

(51) Int. Cl.
*A47F 13/06* (2006.01)
(52) U.S. Cl. ......................... 294/19.1; 294/24
(58) Field of Classification Search ................. 294/19.1, 294/24, 19.2, 104
See application file for complete search history.

(56) References Cited

U.S. PATENT DOCUMENTS

| | | | |
|---|---|---|---|
| 1,104,338 A | 7/1914 | Babitzky | |
| 2,493,108 A | 1/1950 | Casey, Jr. | |
| 3,463,533 A | 8/1969 | Repiscak et al. | |
| 4,669,769 A | 6/1987 | Polder, Jr. | |
| 4,726,263 A | 2/1988 | Lake | |
| 4,850,133 A * | 7/1989 | Burzdak et al. | 43/136 |
| 4,863,204 A | 9/1989 | Peters | |
| 5,402,550 A | 4/1995 | Lessard | |
| D367,597 S | 3/1996 | Westcott | |
| D381,082 S | 7/1997 | Starner | |
| 5,692,417 A | 12/1997 | Irpino | |
| 5,941,587 A | 8/1999 | Wolff et al. | |
| 6,257,990 B1 | 7/2001 | Kariatsumari | |
| 6,446,884 B1 | 9/2002 | Utter et al. | |
| 6,450,557 B1 | 9/2002 | Martinez | |
| 6,604,766 B2 | 8/2003 | Hassell | |
| 6,640,667 B1 | 11/2003 | Pomerantz | |
| D507,408 S | 7/2005 | Figura et al. | |
| 7,665,782 B2 * | 2/2010 | Buzby et al. | 294/19.1 |
| 2003/0020293 A1 * | 1/2003 | Hsu | 294/19.1 |

* cited by examiner

*Primary Examiner* — Isam Alsomiri
*Assistant Examiner* — Gabriela Puig
(74) *Attorney, Agent, or Firm* — Montgomery Patent & Design; Robert C. Montgomery; Joseph T. Yaksich

(57) ABSTRACT

A reach extension device for use inside of motor vehicles intended to provide increased reach is herein disclosed. The device comprises a telescoping handle and an operable spring-style clamping device on its outward end, particularly suited for holding and receiving items often extended out of a car window such as electronic parking passes, tickets, credit cards, paper currency. Additionally, the device is provided with a cup-shaped lower section for paying tolls or receiving change.

19 Claims, 6 Drawing Sheets

EXTENDABLE GRIPPING DEVICE

RELATED APPLICATIONS

The present invention was first described in and claims the benefit of U.S. Provisional Application No. 61/198,550, filed Nov. 7, 2008, the entire disclosures of which are incorporated herein by reference.

FIELD OF THE INVENTION

The present invention relates generally to item gripping devices, and in particular, to a device for gripping and activating items and devices commonly accessed from the window of an automobile.

BACKGROUND OF THE INVENTION

The nearly endless number of items which are encountered at various times and places in life require many different handling means. In many cases, the use of one's hands to grip, pick up, or handle various items can be difficult, uncomfortable, or even impossible. Situations such as retrieving golf balls from the bottom of a pond or the process of picking up fallen household items for someone with a physical ailment require specialized gripping aids.

One such situation is that of accessing and handling objects from the confines of a motor vehicle. Many common situations require a driver or passenger to handle objects through the window of such a vehicle. Such situations include drive-throughs restaurants, toll booths, ticket dispensers, drive up ATMs, and the like. Such situations may require a driver to unbuckle to reach through a window, strain from their seat, or even exit the vehicle.

Various attempts have been made to provide item handling implements and extenders. Examples of these attempts can be seen by reference to U.S. Pat. No. 3,463,533, issued in the name of Repiscak et al., describes an arm extender device. The Repiscak device is a long cylinder with a hook disposed at a distal end to allow the manipulation of side view mirrors from the driver's seat of a vehicle.

U.S. Pat. No. 5,402,550, issued in the name of Lessard, describes a arm extending device for sponges and the like. The Lessard device allows a user to attach an object onto the end of a curved arm via a bracket assembly.

Additionally, ornamental designs for an arm extender exist, particularly U.S. Pat. Nos. D 367,597 and D 507,408. However, none of these designs are similar to the present invention.

While these devices fulfill their respective, particular objectives, each of these references suffer from one or more of the aforementioned disadvantages. Many such devices do not collapse for easy storage. Also, many such devices do not provide both pushing and pulling capabilities or provide the user with precise pushing capabilities for extended activation of small push buttons and the like. Also, many such devices do not allow a user to clamp objects as small as ATM cards and the like. Furthermore, many such devices do not provide storage sections for small objects such as coins and the like which a user may wish to extend. Accordingly, there exists a need for an extendable gripping device without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide extendable manipulation capabilities for objects commonly accessed and handled from a motor vehicle window. Thus, the object of the present invention is to solve the aforementioned disadvantages and provide for this need.

To achieve the above objectives, it is an object of the present invention to provide an automatically extendable gripping and pushing device for thin, card-like objects. The device comprises a clamp, a cup, first and second handle sections, and a handgrip.

Another object of the present invention is to provide a two-part parallel gripping means located at a distal end from the handgrip, which is comprised of the cup and clamp. The gripping means is normally held in a closed state via a spring-loaded pivoting member. The clamp also provides general pulling function with its downward force for items such as paper currency, tickets, and the like.

Yet still another object of the present invention is for the cup to provide a cup-shaped reservoir with a circular top opening for the extension or collection of small items such as coins. The cup is located below the clamp and has a similar diameter. The cup further comprises an integral digit-like appendage on the front which allows a user to press or activate keypad keys, push buttons, and the like. The cup is removably attachable to a distal end of the second handle section via an interference fitting cap-type device.

Yet still another object of the present invention is to comprise the first and second telescoping handle sections and the distal end portion of the handgrip of a plurality of hollow round tubular members made using metal or plastic and having progressively decreasing inner and outer diameters. The sections are attached via a pair of locking collars which use internal threaded components to provide a clamping function, similar to common tripods.

Yet still another object of the present invention is to comprise the handgrip of a pistol-style handgrip portion at a proximal end of the device. The handgrip further comprises a trigger mechanism, a plurality of finger reliefs, and a high-friction outer covering. The finger reliefs and outer covering provide comfortable and stable use of the device. The trigger mechanism is digit-operated and located to provide easy access of an index finger during use.

Yet still another object of the present invention is to initiate opening and closing functions of the clamp in a remote manner via use of the internal trigger mechanism. In a preferred embodiment, the trigger mechanism comprises a pull cable type mechanism routed internally within the telescoping handle sections which is activated by a common rack and pinion type mechanism. The pull cable opens the clamp via a notch and clamp protrusion assembly.

Yet still another object of the present invention comprises said device to be collapsible for easy storage within a vehicle or the like. A gear portion of the internal trigger mechanism comprises a bobbin and spring assembly, which keeps the internal pull cable under constant tension. In this manner, the clamp may be activated by the trigger mechanism even when the device is in a collapsed state.

Yet still another object of the present invention is to provide a method of utilizing the device that provides a unique means of handling and accessing objects from within the confines of a motor vehicle and providing an extended reach to a user in both a pushing and pulling manner.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
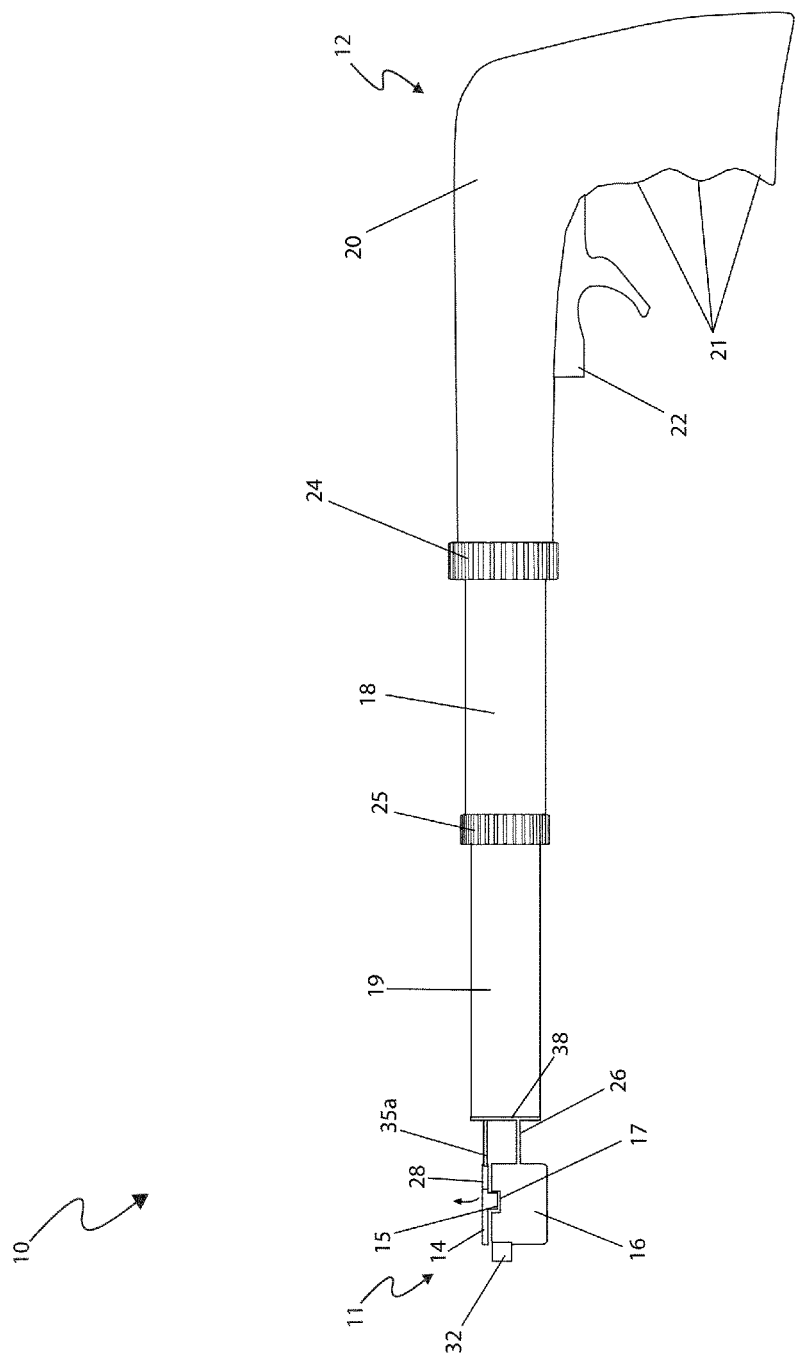
FIG. 1 is a side view of an extendable gripping device 10 depicting an initial extended closed state, according to a preferred embodiment of the present invention.

DESCRIPTIVE KEY 10 extendable gripping device
11 distal end
12 proximal end
14 clamp
15 clamp protrusion
16 cup
17 notch
18 first handle section
19 second handle section
20 handgrip
21 finger relief
22 trigger mechanism
23 pull cable
24 first locking collar
25 second locking collar
26 fixed member
28 pivoting member
30 first spring
31a first hinge
31b second hinge
32 appendage
35a cable attachment arm
35b cable attachment point
36 aperture
38 distal end attachment means
42 trigger teeth
44a first gear
44b first gear shaft
45 bobbin
46a second gear
46b second gear shaft
50 second spring
52 internal protrusion

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an extendable gripping device (herein described as the "device") 10, which comprises a telescoping tubular reaching arm for use by a user positioned inside a motor vehicle enabling easy manipulation of items such as parking tickets, toll monies, and the like. The device 10 comprises a spring-loaded clamp 14 on its distal end 11, particularly suited for holding electronic parking passes, tickets, credit cards, paper currency, and similar items which are typically extended therefrom a vehicle window. Additionally, the device 10 is provided with a cup-shaped lower section 16 for paying or receiving coinage. The overall extended length of the device 10 is approximately thirty (30) inches.

Referring now to FIG. 1, a side view of the device 10 depicting an initial closed state, according to the preferred embodiment of the present invention, is disclosed. The device 10 comprises a clamp 14, a cup 16, a first handle section 18, a second handle section 19, a handgrip 20, a plurality of finger reliefs 21, a trigger mechanism 22, a pull cable 23, a first locking collar 24, and a second locking collar 25. The distal end 11 of the device 10 provides a two-part parallel gripping means held in a normally closed state via a spring-loaded pivoting member 28. The clamp 14 provides a vertically descending clamping means comprising preferably a circularly-shaped platen being approximately two (2) inches in diameter. The clamp 14 also provides a general clamping function thereto various items such as paper currency, tickets, and the like by applying a normal downward force, thereby holding said items firmly in a parallel manner thereagainst a stationary cup 16.

The cup 16 provides a cup-shaped reservoir having a circular top opening comprising a similar mating diameter as the clamp 14. The cup 16 further comprises an integral digit-like appendage 32. The appendage 32 provides a digit-like protrusion along a forward-most end of the device 10, thereby enabling a user to press and/or activate keypad keys, push buttons, and the like during activities such as, for example, operating an automatic teller machine (ATM). The appendage 32 comprises a round or rectangular shape extending approximately three-eighths (⅜) of an inch in a forward direction therefrom a distal perimeter edge of the cup 16. The cup 16 attaches to an integrally molded second handle section 19 via a fixed member 26 and a circular distal end attachment means 38. The fixed member 26 provides an extension means from the cup 16 to the distal end attachment means 38 which further provides an interference fitting circular cap-type device to the distal end portion of the second handle section 19, thereby enabling said cup 16 to be removably attachable to the device 10. The distal end attachment means 38 is slightly larger in diameter than the second handle section 19, thereby enabling said second handle section 19 to be inserted therein. The clamp 14 and cup 16 provide an attachment means thereto a grip portion 20 located at a proximal end 12 of the device 10 via a pair of insertingly telescoping handle sections 18, 19.

The telescoping handle sections 18, 19 and the distal end portion of the handgrip 20 comprise a plurality of hollow round tubular members made using metal or plastic materials and having progressively decreasing inner and outer diameters providing an attachment means therebetween via first 24 and second 25 locking collars. The telescoping handle sections 18, 19 and handgrip 20 connecting first 24 and second 25 locking collars comprise similar materials and construction as those used on many popular photographic tripods using internal threaded components providing a clamping function when manually rotated; however, it is understood that various tube securing mechanisms may be utilized with equal benefit and as such should not be interpreted as a limiting factor of the invention 10 (also see FIG. 6).

The pistol-style handgrip portion 20 is located along a proximal end 12 of the device 10. The handgrip 20 provides a user an ergonomically designed grasping means thereto the device 10 during use. The handgrip 20 further comprises a cylindrically-shaped high-friction plastic or rubber outer covering, a plurality of finger relief features 21, and a trigger mechanism 22. The finger reliefs 21 extend radially therearound said handgrip 20 so as to facilitate comfortable use of the device 10 using either a left or right hand. Furthermore, the proximal end 12 also comprises a digit operated trigger mechanism 22 located along a lower surface of said handgrip 20 to provide a user easy access using an index finger of either hand during use. The trigger mechanism 22 provides a means to initiate opening and closing functions of the aforementioned clamp 14 in a remote manner therefrom an opposite end of the device 10 via an internal trigger mechanism 22 (also see FIG. 6). The trigger mechanism 22 provides an attachment thereto a linear force transmission means being preferably a pull cable 23 type mechanism being routed internally therewithin the telescoping handle sections 18, 19 and the handgrip 20 which provide a conduit means thereto. Said pull cable 23 is in mechanical communication therewith the clamp 14 via a pivoting member 28 being affixed thereto the second handle section 19 and the clamp 14 (also see FIGS. 4 and 5). In like manner, the cup 16 is affixed thereto a distal end portion of the second handle portion 19 via a fixed member 26 and distal end attachment means 38 as abovementioned, thereby enabling the cup 16 to be stationary thereon said second handle portion 19.

Figure 2:
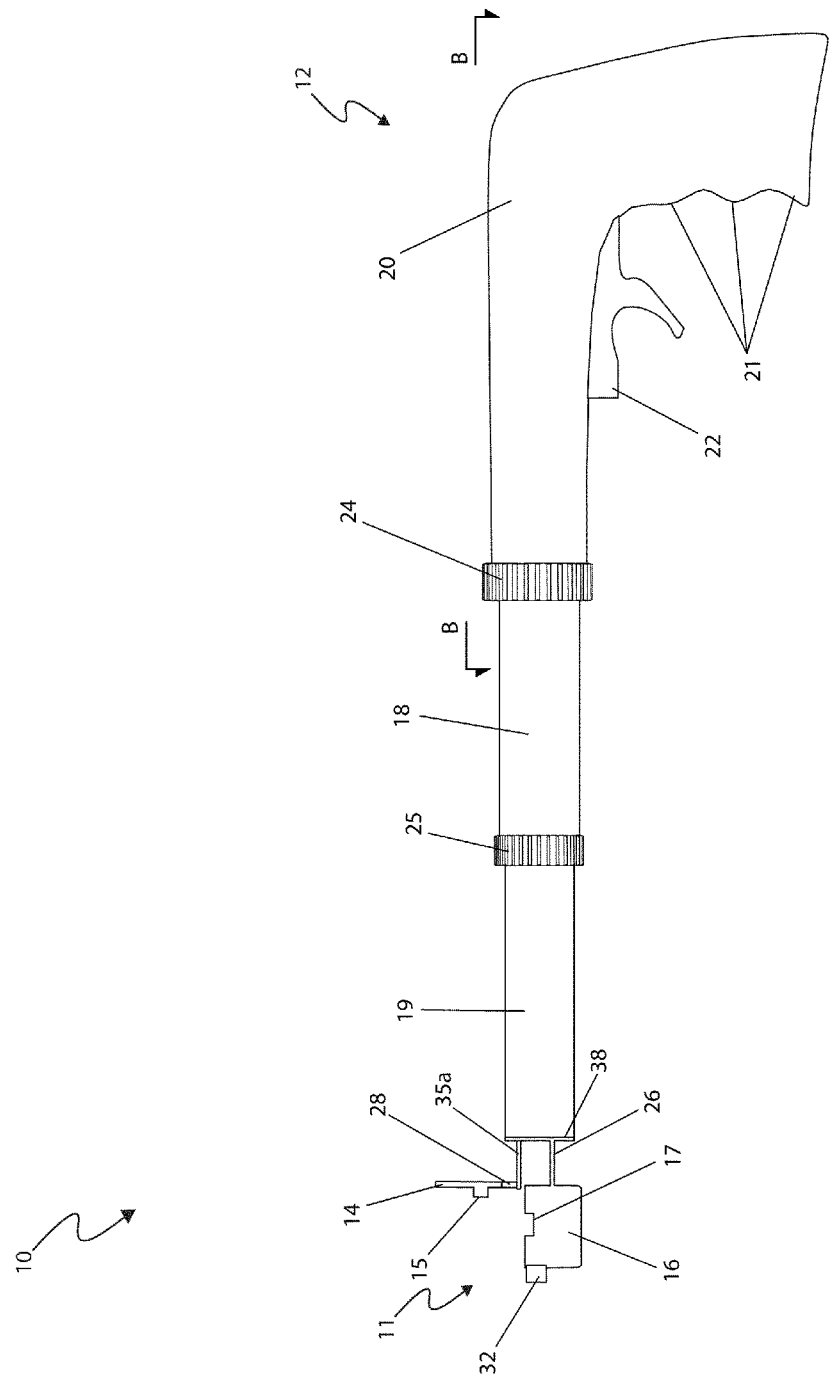
FIG. 2 is another side view of the extendable gripping device 10 depicting an extended open state, according to a preferred embodiment of the present invention.

Referring now to FIG. 2, another side view of the device 10 depicting an open state, according to the preferred embodiment of the present invention, is disclosed. The device 10 is illustrated herein with the trigger mechanism 22 pressed inwardly and the clamp 14 in an open position, thereby providing exposure thereinto the cup 16 of the device 10 which enables desired items to be placed within the device 10.

Figure 3:
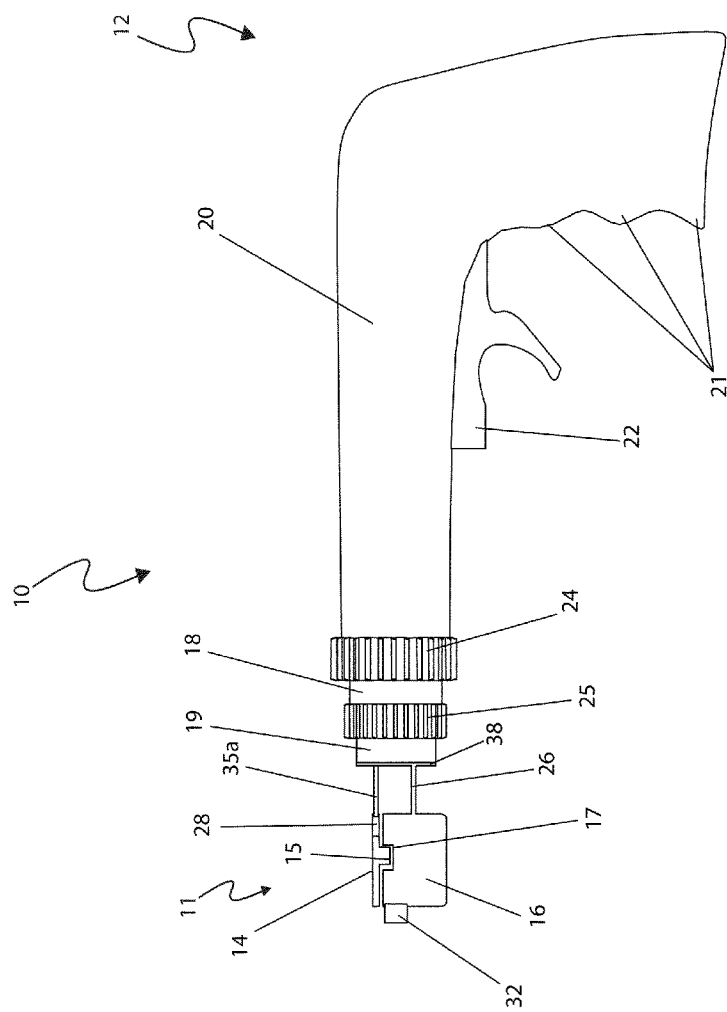
FIG. 3 is another side view of the extendable gripping device 10 depicting a collapsed state, according to a preferred embodiment of the present invention.

Referring now to FIG. 3, another side view of the device 10 depicting a collapsed state, according to the preferred embodiment of the present invention, is disclosed. When the device 10 is in a collapsed or partially collapsed state, the clamp 14 may still be utilized in a normal manner. When in a collapsed state the device 10 also provides a compact storage and transportation means representing approximately one-half (½) the extended length of the device 10, thereby allowing a user to store the device 10 conveniently therewithin a vehicle. Upon expansion, the telescoping handle sections 18, 19 are securely locked using the locking collars 24, 25 (also see FIG. 6). The pull cable 23 is then subsequently taut and ready to pull and lift the clamp 14 upon activation of the trigger mechanism 22. It is further understood that in a partially extended state the device 10 may still be utilized in a partial capacity to perform tasks such as pressing buttons using the appendage 32, and delivering a pre-loaded credit card or ATM card being held therewithin the clamp 14.

Figure 4:
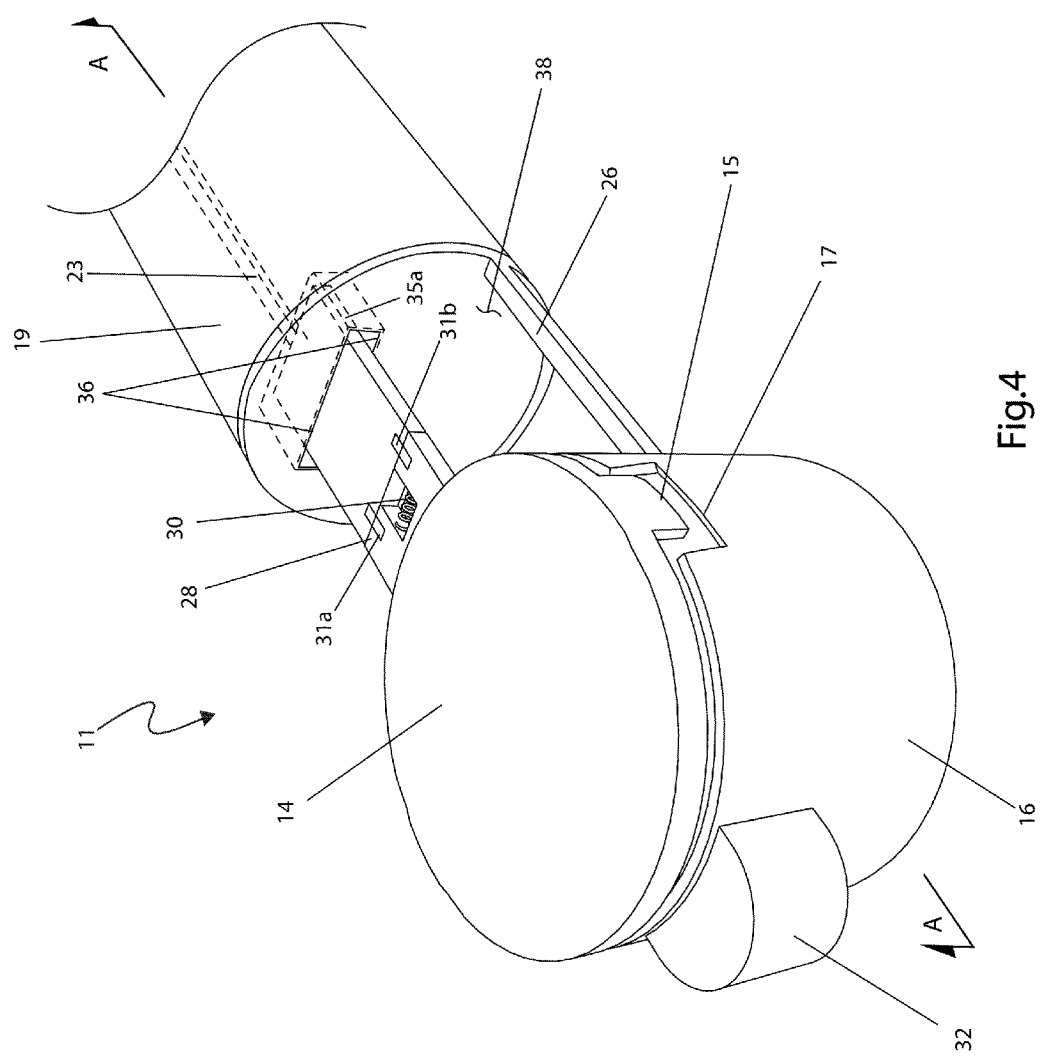
FIG. 4 is a close-up perspective view of an extendable gripping device 10 depicting a distal end 11, according to a preferred embodiment of the present invention.
Figure 5:
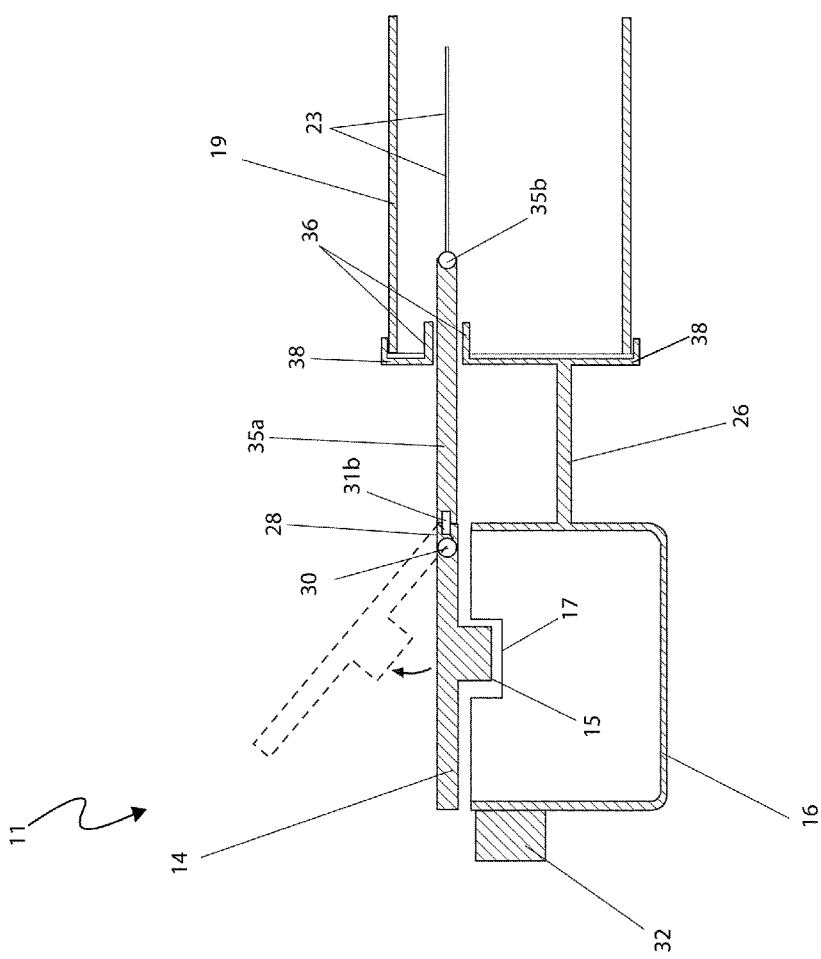
FIG. 5 is a section view of an extendable gripping device 10 taken along line A-A in FIG. 4, according to a preferred embodiment of the present invention; and, FIG. 6 is a section view of the extendable gripping device 10 taken along line B-B in FIG. 2 depicting a proximal end 12, according to a preferred embodiment of the present invention.

Referring now to FIG. 4, a perspective view of the device 10 depicting a distal end 11 and a closed state and FIG. 5, a section view of the device 10 taken along line A-A therein FIG. 4, according to the preferred embodiment of the present invention, are disclosed. The cup 16 is integrally molded, on each side portion, to the fixed member 26 which is further integrally molded to the distal end attachment means 38, thereby providing an interference fitting means to the second handle section 19 as abovementioned. An intermediate portion of the distal end attachment means 38 comprises a rectangular aperture 36, thereby providing a horizontal track-type device for the insertion of the clamp 14. The cup 16 also comprises a notch 17 therealong each upper longitudinal surface thereof, thereby providing an engagement means to a clamp protrusion 15 located on a lower surface of the clamp 14 at opposing positions along the perimeter edge. The notch 17 and clamp protrusion 15 enable the clamp 14 to open and close, as discussed herein below.

A rear proximal portion of the clamp 14 comprises a rectangular pivoting member 28, thereby providing an upward and downward motion to said clamp 14. A distal portion of the pivoting member 28 is integrally molded to the clamp 14 and a proximal portion of the pivoting member comprises a "U"-shaped form further comprising a first spring 30, a first hinge 31*a*, and a second hinge 31*b*. The first spring 30 provides a clamping force therebetween the clamp 14 and the cup 16 until such time that a user depresses the trigger mechanism 22, thereby enabling the clamp 14 to be at an open state. The first spring 30 is preferably a torsion spring, yet other elastic mechanisms may be utilized without limiting the functions of the device 10. The hinges 31*a*, 31*b* connect the pivoting member 28 to a rectangular cable attachment arm 35*a*. Said hinges 31*a*, 31*b* are conventional bearing devices which limit the angle of rotation of the clamp 14. A proximal end portion of the cable attachment arm 35*a* comprises a cable attachment point 35*b* to attach a desired length of pull cable 23 thereto via means such as, but not limited to: welding, adhesive, knotting, or the like. The pull cable 23 is fabricated from durable materials such as, but not limited to: braided metal, plastic, or the like. The device 10 is illustrated here utilizing a cable-type mechanism; however, it is understood that other mechanisms may be provided using internal or external force communicating elements and as such should not be interpreted as a limiting factor of the invention 10. In use, the clamp 14 is positioned in an initial closed position via the first spring 30 and the pull cable 23 is continually pulled taut. As the pull cable 23 is pulled in a backwards position via the trigger mechanism 22 a force is applied to pull the clamp 14 toward an internal portion thereof, thereby forcing the clamp protrusion 15 to engage a rear portion of the notch 17. The continual force applied to the clamp protrusion 15 against the notch 17 causes the hinges 31*a*, 31*b* to rotate in an upward position which in turn causes the first spring 30 to rotate and the clamp protrusion 15 to exit the notch 17.

Figure 6:
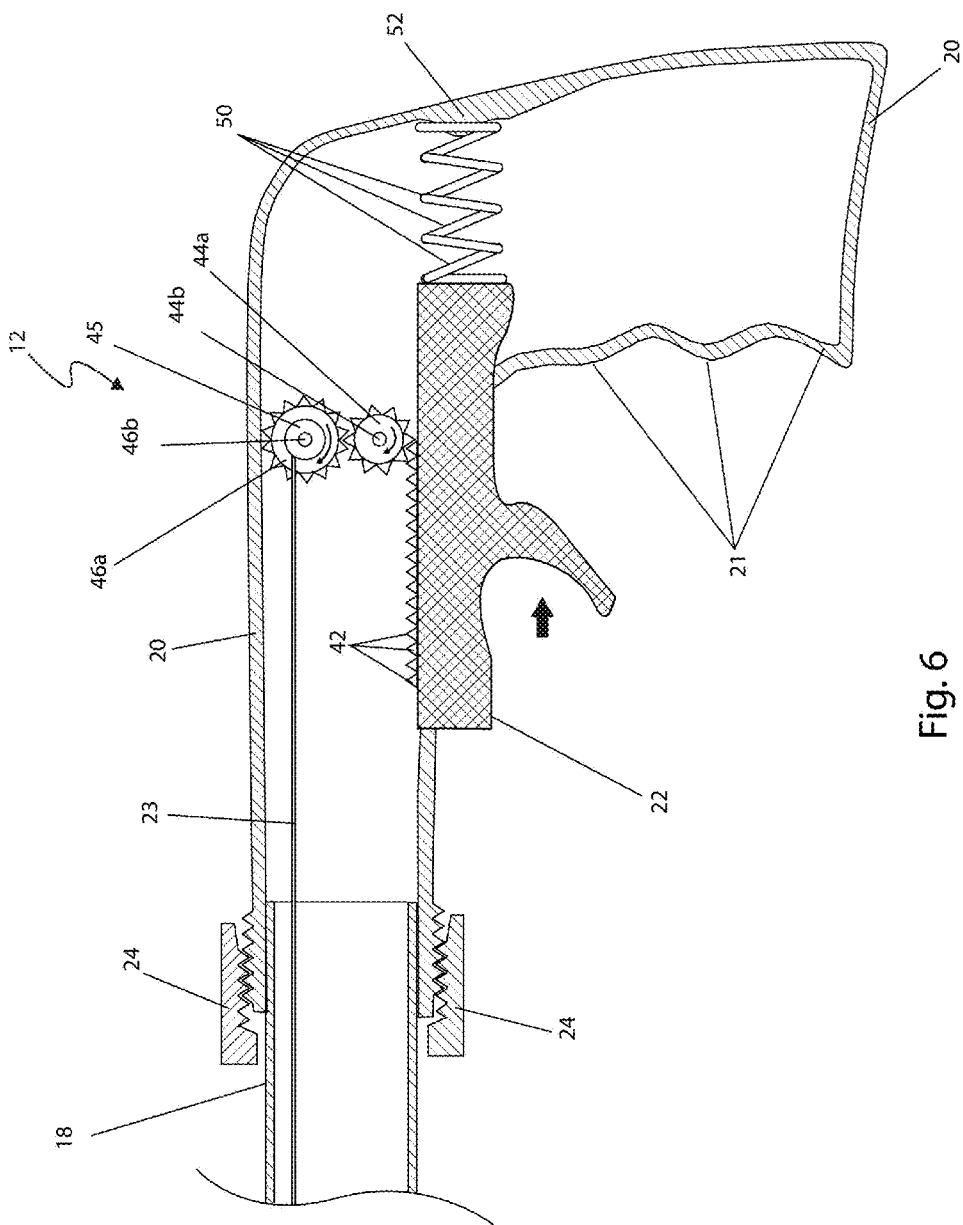

Referring now to FIG. 6, a section view of the device 10 depicting a proximal end 12, according to the preferred embodiment of the present invention, is disclosed. The proximal end 12 comprises a handgrip 20 which is similar to pistols or guns and is fabricated from materials such as, but not limited to: metal, plastic, or the like. The handgrip 20 comprises a plurality of finger reliefs 21 as abovementioned. Said handgrip 20 also comprises a digit-operated sliding trigger mechanism 22, thereby enabling the clamp 14 to be opened and closed as desired by the user. The trigger mechanism 22 is preferably a conventional rack-and-pinion mechanism which converts a rotational motion to a linear motion, yet other mechanisms may be utilized without limiting the functions of the device 10. An upper longitudinal and internal portion of the trigger mechanism 22 comprises a plurality of trigger teeth 42 which spans a distal portion to an intermediate portion thereof. The trigger teeth 42 are preferably pointed and comprise identical pitches and are spaced equidistantly. As the trigger mechanism 22 is pulled back the trigger teeth 42 engage identical teeth positioned thereabove on a first gear 44a and a second spring 50 located at a proximal portion of the trigger mechanism 22 depresses against a internal protrusion 52 which is integrally molded to an interior position of the handgrip 20. The second spring 50 is preferably a compression spring, yet other elastic-type mechanisms may be utilized without limiting the functions of the device 10. The first gear 44a is preferably a toothed cylinder and the second gear 46a is preferably a toothed cylinder comprising an intermediate bobbin portion 45. As the trigger teeth 42 engage the teeth on the first gear 44a, said first gear 44a rotates in a counterclockwise direction which rotates a slightly larger second gear 46a thereabove in a clockwise direction simultaneously. This rotating motion enables a tensile force to be applied to the pull cable 23 which enables said pull cable 23 to be pulled tautly in the backwards direction, thereby opening the clamp 14. At full compression of the trigger mechanism 22, the clamp 14 opens to its widest position. The user may motion the trigger mechanism 22 to any fully open or fully closed position to achieve any desired incremental open or incremental closed position. The second gear 46a comprises identical teeth to the first gear 44a and also comprises an intermediately positioned cylindrical bobbin 45. The bobbin 45 comprises a conventional spring tensioning mechanism, thereby enabling the pull cable 23 to be continually under tension whether in a collapsed state or extended state. The spring tension in the bobbin 45 will never overcome the spring tension of the first spring 30. When the trigger mechanism 22 is depressed the force applied to the bobbin 45 will overcome the spring tension of the first spring 30, thereby enabling the clamp 14 to open. The pull cable 23 is wound on the bobbin 45 in a conventional manner. The first gear 44a and second gear 46a rotate and attach to the internal portion of the handgrip 20 via a first gear shaft 44b and a second gear shaft 46b, respectively. The first gear shaft 44b and the second gear shaft 46b are attached to the internal portion of the handgrip 20 in a freely rotating manner. The gear shafts 44b, 46b enable the gears 44a, 44b to rotate about an axis in an appropriate direction which concurrently wind or unwind the pull cable 23 on the bobbin 45. The second gear shaft 46b would be encompassed by the spring tensioning mechanism of the bobbin, thereby simultaneously rotating the second gear 46a and bobbin 45 in the appropriate direction as manipulated via the trigger mechanism 22. Said gears 44a, 46a are fabricated from a material such as, but not limited to: metal, plastic, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1 through 6.

The method of utilizing the device 10 may be achieved by performing the following steps: acquiring the device 10; manually rotating the locking collars 24, 25 to unlock the telescoping handle sections 18, 19 therefrom a collapsed state for an extended reach if desired; extending the telescoping handle sections 18, 19 thereto a fully deployed length; rotating the locking collars 24, 25 to lock the telescoping handle sections 18, 19 in position; grasping the handgrip portion 20 of a proximal end 12 thereof the device 10 with either a left or right hand using the finger reliefs 21; pre-loading a desired item such as a credit card or ATM card therebetween the clamp 14 and cup 16 of a distal end 11 thereof the device 10, thereby depressing the trigger mechanism 22 to rotate the gears 44a, 46a, tighten the pull cable 23, depress the second spring 50, pull the cable attachment means 35a which in turn motions the clamp protrusion 15 toward a rear portion of the notch 17, thereby pivoting the hinges 31a, 31b to open the clamp 14 via rotating the first spring 30; placing a desired item therebetween the clamp 14 and cup 16; releasing the trigger mechanism, thereby clamping the desired item therebetween the clamp 14 and the cup 16; extending the device 10 therefrom one's vehicle toward a bank attendant, a toll booth attendant, or an ATM; delivering the pre-loaded card thereto said attendant or thereinto a receiving slot; releasing the trigger mechanism 22 to release said card; pressing keypad buttons, pushbuttons, or the like, using the appendage 32 to perform various business transactions, as necessary; placing coinage or other items therewithin the cup 16; extending the device 10 as previously described to deliver said coinage and/or miscellaneous items thereto a toll basket, attendant, or the like; depressing the trigger mechanism 22 to open the clamp 14, thereby exposing and/or emptying included coinage and/or items, as needed; receiving a card, coinage, or other items by extending the device 10 with the clamp 14 in an open state via depressing the trigger mechanism 22; releasing the trigger mechanism 22 to secure said items therewithin the device 10; withdrawing the device 10 thereto one's vehicle in an expected manner to retain said contents; and, benefiting from increased access thereto ATMs, toll booths, and other vehicle accessible services using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An extendable gripping device, further comprising:
   a telescoping tubular body comprising a proximal end and a distal end;
   a handle portion located at said proximal end;
   a gripping portion located at said distal end; and,
   a control means for actuating said gripping portion between a fully open state and a closed state in gripping and holding an item;
   wherein said device is incrementally extended between a fully extended state and a fully contracted state;
   wherein said gripping portion is operational at any desired extended length and, wherein said gripping portion comprises a clamp pivotally connected to a cable attachment arm by a pair of hinges wherein said cable attachment arm is fixed inside an aperture of the telescoping tubular body.

2. The extendable gripping device of claim 1, wherein said tubular telescoping body further comprises:
   a first telescoping section affixed to a distal end of said handle portion; and,
   a second telescoping section affixed to a distal end of said first telescoping section;
   wherein said second telescoping section is slidably engaged therein said first telescoping section and said first telescoping section is slidably engaged therein said handle portion.

3. The extendable gripping device of claim 2, further comprising:
   a first locking collar for securing a length of said first telescoping section with respect to said handle portion; and,
   a second locking collar for securing a length of said second telescoping section.

4. The extendable gripping device of claim 1, wherein said handle portion further comprises a pistol-style handgrip further comprising a plurality of finger reliefs and a high-friction outer covering.

5. The extendable gripping means of claim 1, wherein said gripping portion further comprises a two-part parallel gripping means removably attached to said distal end of said telescoping body and to a distal end of said control means at a cable attachment point, said gripping portion further comprises:
   a cap, comprising a rear end removably connected to said distal end of said telescoping body;
   a cup fixedly attached to a front end of said cap;
   the aperture of said cap located at a superjacent position to said cup
   said clamp pivotally attached to said control means via a pivoting member;
   wherein said clamp and said cup each comprise a matching diameter and a closure means;
   wherein said aperture permits passage of said pivoting member to attach thereto said control means;
   wherein said clamp permits access thereto an interior of said cup when in an open state and restricts access thereto said interior when in said closed state;
   wherein said pivoting member maintains said clamp in said closed state until actuated thereupon by said control means; and,
   wherein said gripping portion is selectively controlled by said control means between said closed state and said fully open state.

6. The extendable gripping means of claim 5, wherein said cup further comprises a protruding forward edge.

7. The extendable gripping portion of claim 5, wherein said pivoting member further comprises:
   a distal portion integrally molded to said clamp; and,
   a proximal portion comprising a "U"-shaped form further comprising:
      a first spring providing a clamping force between said clamp and said cup;
      said pair of hinges connecting said pivoting member to a distal end of said cable attachment arm; and,
      said cable attachment arm attached to said control means at a proximal end;
   wherein said pivoting member provides an upward and downward force thereto said clamp upon actuation thereby said control means.

8. The extendable gripping means of claim 5, wherein said closure means further comprises a pair of protrusions on diametrically opposing locations of a bottom outside surface of said clamp correspondingly engaging therewith a pair of notches located on diametrically opposing locations of an upper perimeter edge of said cup;
   wherein said control means acts upon said pivoting member, such that said protrusions are forced against a rear portion of said pair of notches, thereby enabling said pivoting member to hinge upon said pair of hinges.

9. The extendable gripping means of claim 1, wherein said control means comprises:
   a trigger mechanism extending outward from said handle portion;
   a driving mechanism located within said handle portion and mechanically driven by said trigger mechanism; and,
   a cable driven by said driving mechanism at a proximal end and attached thereto said gripping portion at a distal end, wherein said cable is routed internally through said telescoping body;
   wherein said trigger mechanism drives said driving mechanism, which in turn drives said cable to actuate said gripping portion between said fully open state and said closed state.

10. The extendable gripping means of claim 9, wherein said driving mechanism further comprises:
   a rack-and-pinion mechanism located on an upper longitudinal and internal portion of said trigger mechanism within said handle portion, comprising a plurality of equidistantly-spaced teeth spanning a distal portion to an intermediate portion thereof;
   a second spring located at a proximal portion of said trigger mechanism depressing against an internal protrusion of said handle portion;
   a first gear rotatably affixed to an interior portion of said handle portion with a first gear shaft, further comprising a toothed cylinder in mechanical communication with said plurality of trigger teeth; and,
   a second gear rotatably affixed to an interior portion of said handle portion with a second gear shaft, further comprising a toothed cylinder in mechanical communication with said first gear, further comprising a bobbin affixed to said proximal end of said cable;
   wherein said trigger mechanism drives said rack and pinion mechanism, which drives said first gear, said second gear, and said bobbin to provide a tensile force to said cable;
   wherein said trigger mechanism is incrementally depressed to provide a selectable open state of said gripping portion;
   wherein when said trigger mechanism is fully depressed, said gripping portion is in said fully open state; and,
   wherein said bobbin further comprises a spring tensioning mechanism enabling said cable to be continually under tension.

11. The extendable gripping device of claim 9, wherein said cable comprises either a braided metal or plastic resilient construction.

12. An extendable gripping device, further comprising:
   a telescoping body extendable between a fully extend state and a fully retracted state, further comprising:
      a handle portion;
      a first telescoping section affixed to a distal end of said handle portion and slidably engaged therein said handle portion; and, a second telescoping section affixed to a distal end of said first telescoping section and slidably engaged therein said first telescoping section;

a gripping portion removably attached to a distal end of said second telescoping section and selectably operable between a fully open state and a closed state, further comprising:

a cap, comprising a rear end removably attached to said distal end of said telescoping body;

a cup fixedly attached to a front end of said cap;

an aperture of said cap located at a superjacent position to said cup, thereby permitting passage of a pivoting member;

a clamp comprising a matching diameter to said cup, wherein said clamp permits access thereto an interior of said cup when in an open state and restricts access thereto said interior when in said closed state;

a pivoting member further comprising a distal portion integrally molded to said clamp and a proximal portion comprising a "U"-shaped form, said proximal portion further comprising:

a first spring providing a clamping force between said clamp and said cup;

a cable attachment arm, comprising a proximal end and a distal end; and, a pair of hinges connecting said pivoting member to said distal end of said cable attachment arm; wherein said cable attachment arm is fixed inside the aperture of said second telescoping section;

a closure means;

a control means located within telescoping body said for selectively actuating said gripping portion between said fully open state and said closed state in gripping and holding an item, said control means further comprises a proximal end located within said handle portion and a distal end connected to said cable attachment arm of said pivoting member;

wherein said device is incrementally extended between a fully extended state and a fully contracted state;

wherein said gripping portion is operational at any desired extended length; and, wherein said pivoting member maintains said clamp in said closed state until actuated thereupon by said control means, wherein said pivoting member provides an upward and downward force thereto said clamp.

13. The extendable gripping device of claim 12, further comprising:

a first locking collar for securing a length of said first telescoping section with respect to said handle portion; and, a second locking collar for securing a length of said second telescoping section.

14. The extendable gripping device of claim 12, wherein said handle portion further comprises a pistol-style handgrip further comprising a plurality of finger reliefs and a high-friction outer covering.

15. The extendable gripping means of claim 12, wherein said cup further comprises a protruding forward edge.

16. The extendable gripping means of claim 12, wherein said closure means further comprises a pair of protrusions on diametrically opposing locations of a bottom outside surface of said clamp correspondingly engaging therewith a pair of notches located on diametrically opposing locations of an upper perimeter edge of said cup;

wherein said control means acts upon said pivoting member, such that said protrusions are forced against a rear portion of said pair of notches, thereby enabling said pivoting member to hinge upon said pair of hinges.

17. The extendable gripping means of claim 12, wherein said control means comprises:

a trigger mechanism extending outward from said handle portion;

a driving mechanism located within said handle portion and mechanically driven by said trigger mechanism; and, a cable driven by said driving mechanism at a proximal end and attached thereto said gripping portion at a distal end, wherein said cable is routed internally through said telescoping body;

wherein said trigger mechanism drives said driving mechanism, which in turn drives said cable to actuate said gripping portion between said fully open state and said closed state.

18. The extendable gripping means of claim 17, wherein said driving mechanism further comprises:

a rack-and-pinion mechanism located on an upper longitudinal and internal portion of said trigger mechanism within said handle portion, comprising a plurality of equidistantly-spaced teeth spanning a distal portion to an intermediate portion thereof;

a second spring located at a proximal portion of said trigger mechanism depressing against an internal protrusion of said handle portion;

a first gear rotatably affixed to an interior portion of said handle portion with a first gear shaft, further comprising a toothed cylinder in mechanical communication with said plurality of trigger teeth; and, a second gear rotatably affixed to an interior portion of said handle portion with a second gear shaft, further comprising a toothed cylinder in mechanical communication with said first gear, further comprising a bobbin affixed to said proximal end of said cable;

wherein said trigger mechanism drives said rack and pinion mechanism, which drives said first gear, said second gear, and said bobbin to provide a tensile force to said cable;

wherein said trigger mechanism is incrementally depressed to provide a selectable open state of said gripping portion;

wherein when said trigger mechanism is fully depressed, said gripping portion is in said fully open state; and, wherein said bobbin further comprises a spring tensioning mechanism enabling said cable to be continually under tension.

19. The extendable gripping device of claim 18, wherein said cable comprises either a braided metal or plastic resilient construction.

* * * * *